United States Patent Office 3,801,655
Patented Apr. 2, 1974

3,801,655
METHOD OF PREPARING MONOALCOHOLS FROM p-MENTHANE-3,4-DIOL AND p-MENTHANE-1,2-DIOL
Albert B. Booth, Jekyll Island, Ga., assignor to Hercules Incorporated, Wilmington, Del.
No Drawing. Continuation of abandoned application Ser. No. 757,463, Sept. 4, 1968. This application Oct. 14, 1971, Ser. No. 189,367
Int. Cl. C07c 35/12
U.S. Cl. 260—631 H
6 Claims

ABSTRACT OF THE DISCLOSURE

Disclosed is a method of preparing monoalcohols from the diols, p-menthane-3,4-diol and p-menthane-1,2-diol by contacting the diol with a hydrogenation catalyst in the presence of hydrogen.

This is a continuation of application Serial No. 757,463, filed September 4, 1968, now abandoned.

This invention relates to the preparation of monoalcohols from the diols, p-menthane-3,4-diol and p-menthane-1,2-diol.

In accordance with this invention, mixed isomeric racemic menthols are produced in high yield from the diol, p-menthane-3,4-diol; and mixed isomeric carvomenthols are produced in high yield from the diol, p-menthane-12-diol. A yield of about 90% by weight of theoretical of monoalcohol, based on the diol, is obtainable in each case.

Mixed isomeric racemic menthols are obtained by contacting, at an elevated temperature, p-menthane-3,4-diol with a hydrogenation catalyst in the presence of hydrogen at a pressure above atmospheric pressure. The reaction involves selectively hydrogenating the tertiary hydroxy and the splitting off of water. The reaction can be represented by the following

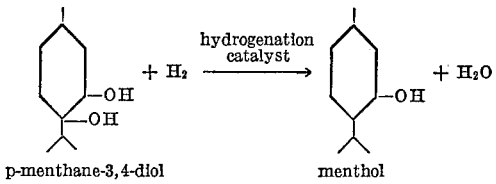

p-menthane-3,4-diol      menthol

Mixed isomeric racemic carvomenthols are obtained by contacting, at an elevated temperature, p-menthane-1,2-diol with a hydrogenation catalyst in the presence of hydrogen at a pressure above atmospheric pressure.

Examples of hydrogenation catalysts that can be employed in this invention include Raney nickel, Raney cobalt, copper chromite, platinum oxide, and nickel on kieselguhr. Mixtures of hydrogenation catalyst can be used if desired. The amount of hydrogenation catalyst employed will be on the order of from about 1% to about 20% by weight based on the weight of the starting diol employed.

Reaction is carried out at an elevated temperature of from about 175° C. to about 275° C. with the preferred temperature being in the range of from about 200° C. to about 270° C. Reaction proceeds more rapidly at the higher temperatures than at the lower temperatures.

The reaction can be carried out in the presence of, or in the absence of, an organic solvent for the diol reactant. Solvents employed are those that will not react with the diol reactant, that will not react with the monoalcohol reaction product, and that are not readily hydrogenated under the reaction conditions employed. Examples of suitable solvents include isopropanol, cyclohexanol, menthol, dibutyl ether, cyclohexane, ethanol, and glycol methyl ether. Mixtures of two or more solvents can be employed if desired.

When a low boiling solvent is used such, for example, as isopropanol it is desirable to use hydrogen under sufficient pressure to keep the low boiling solvent in the liquid phase and provide a partial pressure of hydrogen in excess of the partial pressure of the solvent. Otherwise pressure of the hydrogen during reaction is not critical.

Water is formed as one of the reaction products. At the temperature employed in carrying out the reaction, the amount of water formed is usually soluble in the reaction mass. However, upon cooling of the reaction mass to room temperature, the water separates as a separate phase. This separate water phase has some tendency to form a pasty mass with hydrogenation catalyst. This undesirable situation can be avoided by the addition of a water-miscible solvent. As an alternate procedure, the crude reaction mass can be filtered while hot and under pressure so that the water reaction product remains dissolved in the crude mono-alcohol reaction product during filtration.

The following examples are illustrative of this invention. All parts and percentages are by weight unless otherwise specified.

EXAMPLE 1

Ninety-two (92) parts crude p-menthane-3,4-diol (mixed isomers, about 90% total diol, prepared by hydration of mixed isomers of technical 3-menthene oxide) is charged to a stirred autoclave with 15 parts of copper chromite and 200 parts isopropanol. Reaction is carried out at 200° C. in the presence of hydrogen at 1000 p.s.i.g. pressure. Samples of the reaction mass are taken at 7, 13 and 25 hours. At the end of 25 hours the reaction mass is removed from the autoclave and filtered. Infrared and GC analyses show the reaction proceeds slowly under these conditions, with about half of the diol reacted in 25 hours. To speed up the reaction, the filtrate is recharged with the same amount of copper chromite and reaction is carried out at 225° C. for 12 hours. Sampling at this time shows the reaction to be nearly complete. Product analysis (solvent free basis) shows:

|  | Percent |
|---|---|
| Menthols; over half dl isomer | 71.8 |
| Unidentified material | 21.6 |
| Unreacted diol | 6.6 |

The yield on reacted diol is about 85% of theoretical. After cooling, the crude solution is filtered to remove copper chromite, the isopropanol is distilled off, and the menthol is recovered in the form of mixed isomers suitable for final rectification to obtain pure dl menthol.

EXAMPLE 2

Ninety-four and a half (94.5) parts of crude p-menthane-3,4-diol (about 90% total diol) is charged to a stirred autoclave with 15 parts of Raney nickel (30 parts of water-nickel slurry from which the water is displaced by washing with isopropanol) and 200 parts isopropanol. Hydrogenation is started at 175° C. in the presence of hydrogen at a pressure of 830 p.s.i.g. Hydrogen absorption shows that the reaction is proceeding slowly at this temperature. The temperature is raised to 190° C. where hydrogen uptake proceeds at a more rapid rate. The autoclave is sampled after 6 hours at this temperature. GC analysis of the product (solvent free basis) shows:

|  | Percent |
|---|---|
| Menthols, over half dl menthol | 74.2 |
| Unidentified material | 21.3 |
| Unreacted diol | 4.5 |

The yield on diol reacted is about 87%.

EXAMPLE 3

Eighty-seven (87) parts crude p-menthane-3,4-diol (about 90% total diol) is charged to a rocking autoclave with 3 parts of copper chromite and 200 parts of isopropanol. The rocking autoclave is filled to 1000 p.s.i.g. hydrogen pressure at room temperature (about 23° C.), sealed, heated to 250° C. and held at 250° C. overnight. GC analysis of the product (solvent free basis) shows:

|  | Percent |
|---|---|
| Menthols, over half dl menthol | 76.3 |
| Unidentified material | 17.2 |
| Unreacted diol | 6.5 |

The yield on diol reacted is about 91%.

EXAMPLE 4

Three hundred fourteen (314) parts crude p-menthane-3,4-diol (about 90% diol) is charged to a rocking autoclave together with 3 parts copper chromite. The autoclave is filled to 1575 p.s.i.g. with hydrogen at room temperature, sealed, rocked 12 hours at 260° C., and then 12 hours at 270° C. GC analysis of the product (solvent free basis) shows:

|  | Percent |
|---|---|
| Menthols, over half dl menthol | 78.6 |
| Unidentified material | 15.4 |
| Unreacted diol | 6 |

The yield on diol reacted is about 95%. The contents of the autoclave are filtered, and after removal of dissolved and suspended water, the crude menthol reaction mass is suitable for final rectification.

EXAMPLE 5

One hundred (100) parts crude p-menthane-1,2-diol, 200 parts isopropanol, and 3 parts copper chromite are charged to a rocking autoclave. The autoclave is filled to 1350 p.s.i.g. with hydrogen at room temperature, sealed, and rocked at 260° C. for 12 hours. A sample taken at this time shows reaction is incomplete. Another 3 parts of copper chromite is added and reaction is run at 270° C. for another 12 hours. Analysis shows reaction nearly complete. After cooling, copper chromite is removed by filtration and the crude carvomenthol mixture is separated from the isopropanol. GC analysis of the product shows:

|  | Percent |
|---|---|
| Neocarvomenthol | 20 |
| Carvomenthol | 52 |
| Isocarvomenthol | 10 |
| Neoisocarvomenthol | 7 |
| Unreacted diol | 2 |
| Unidentified material | 9 |

As is known in the art, dl menthol is widely used to impart a minty odor and flavor and a cooling sensation to medicinals, cosmetics and other products. Carvomenthol, especially as the acetate ester, is useful in perfumery.

It is to be understood that the above description and specific working examples are illustrative of the invention and not in limitation thereof.

What I claim and desire to protect by Letters Patent is:

1. A process which comprises contacting a diol selected from the group consisting of p-menthane-3,4-diol and p-menthane-1,2-diol with a hydrogenation catalyst in the presence of hydrogen at a pressure above atmospheric pressure and at a temperature of from about 175° C. to about 275° C. whereby there is produced, in the case of p-menthane-3,4-diol, menthol; and in the case of p-menthane-1,2-diol, carvomenthol, the hydrogenation catalyst being selected from the group consisting of copper chromite, nickel cobalt, and platinum oxide.

2. The process of claim 1 wherein the contacting is carried out at an elevated temperature of from about 200° C. to about 270° C.

3. The process of claim 1 wherein the catalyst is copper chromite.

4. The process of claim 1 wherein the catalyst is nickel.

5. The process of claim 1 wherein the catalyst is cobalt.

6. The process of claim 1 wherein the catalyst is platinum oxide.

References Cited

UNITED STATES PATENTS

| 1,793,020 | 2/1931 | Schoeller et al. | 260—631 H |
| 3,351,645 | 12/1967 | Caldwell | 260—410 |

OTHER REFERENCES

Lohse, "Catalytic Chemistry," Chem. Publ., Brooklyn, N.Y. (1945), pp. 221 and 222.

LEON ZITVER, Primary Examiner

D. B. SPRINGER, Assistant Examiner